(12) United States Patent
Cavello (10) Patent No.: US 6,315,433 B1
(45) Date of Patent: Nov. 13, 2001

(54) ICE LIGHTING FIXTURE

(76) Inventor: Christopher Cavello, 2503 Indian Trail, Austin, TX (US) 78703

( * ) Notice: Subject to any disclaimer, the term of this patent is extended or adjusted under 35 U.S.C. 154(b) by 0 days.

(21) Appl. No.: 09/296,009

(22) Filed: Apr. 21, 1999

(51) Int. Cl.[7] .................................................. F21V 33/00
(52) U.S. Cl. ........................ 362/318; 362/161; 362/101; 362/806
(58) Field of Search .................................... 362/159, 161, 362/171, 172, 173, 181, 182, 101, 318, 392, 806, 810; 431/288, 289, 290, 291; 249/117

(56) References Cited

U.S. PATENT DOCUMENTS

| D. 110,145 | 6/1938 | Goughnour . |
|---|---|---|
| D. 318,927 | 8/1991 | Cleminshaw et al. . |
| 383,862 | 6/1888 | Clarke . |
| 1,060,278 * | 4/1913 | Nelson ................................ 362/392 |
| 2,080,251 | 5/1937 | Buskard . |
| 3,493,314 | 2/1970 | Krance et al. . |
| 3,781,164 | 12/1973 | McCaffery . |
| 3,890,085 | 6/1975 | Andeweg . |
| 4,034,213 | 7/1977 | Norris . |
| 4,399,494 | 8/1983 | Perkins . |
| 4,427,366 | 1/1984 | Moore . |
| 4,563,726 | 1/1986 | Newcomb et al. . |
| 4,595,094 | 6/1986 | Reid . |
| 4,681,534 | 7/1987 | Schenke et al. . |
| 4,759,699 | 7/1988 | Rubarth . |
| 4,926,298 | 5/1990 | Zimmerman . |
| 5,078,945 | 1/1992 | Byron . |
| 5,338,187 * | 8/1994 | Elharar ................................ 431/288 |
| 5,504,663 | 4/1996 | Tucker . |
| 5,697,694 | 12/1997 | Cutts . |
| 5,860,724 * | 1/1999 | Cheng ................................ 362/34 |

FOREIGN PATENT DOCUMENTS 298 18 160
U1   3/1999   (DE) .

OTHER PUBLICATIONS

International Search Report.

* cited by examiner

Primary Examiner—Y. Quach
(74) Attorney, Agent, or Firm—Brian F. Russell; Bracewell & Patterson, L.L.P.

(57) ABSTRACT

The present invention relates to a lighting fixture that functionally provides a mold for creating a light diffuser from ice, a stand upon which to display the created light diffuser (including a shaped-surface support element to stabilize the light diffuser as it de-solidifies), a collection element to collect and contain the melted light diffuser material, and a support and containing system for a light source that, in use, is surrounded by the light diffuser.

43 Claims, 5 Drawing Sheets

The present invention combines a light source with a light diffuser where the latter is constructed of a diffuser material that, while initially solid or frozen, commences to melt at room temperature during utilization of the invention. The light source can be of many types, including but not limited to candles, incandescent or fluorescent lights, phosphorescent chemical combinations, light emitting diodes (LEDs), and so forth. The light diffuser can likewise be constructed from many types of diffuser materials, including but not limited to clear or colored frozen water, "dry ice," other frozen substances that, at normal room temperatures ranging from 60 to 85 degrees Fahrenheit, are generally found in liquid, liquid-like, or gaseous forms. This further includes diffuser materials that, when exposed to the heat of a specific light source being used, melt and assume a liquid form at an increased rate. Naturally, this invention is suitable for both indoor and outdoor utilization.

ICE LIGHTING FIXTURE

FIELD OF THE INVENTION

The present invention relates generally to an ornamental lighting fixture. In particular, the present invention provides a system for creating and displaying a lighting fixture having a light diffuser formed by a frozen liquid that melts during utilization of the invention, a light source substantially surrounded by the light diffuser, and a base element to support the diffuser and light source. In a preferred embodiment of the invention, this base element also serves to collect the diffuser material as it melts, and further serves as the shape mold for creating and recreating the light diffuser.

BACKGROUND OF THE INVENTION

It is common in restaurants and other commercial establishments to use decorative lighting fixture such as lamps and candle holders to create an atmosphere and ambiance that is pleasant for customers. Many restaurants, for example, will commonly put a candle in a tubular container that is designed to collect the pool of melted liquid wax created as the candle burns. Another common lighting fixture employs a pool of oil contained in a cylindrical vase with a wick supported by a floating member. In recent times, the use of lighting fixtures has received new interest in the consumer markets, and demand for aesthetically pleasing and creatively designed lighting fixtures has steadily increased.

Likewise, many restaurants and other commercial establishments also use aesthetically attractive "ice sculptures" to similarly create or enhance an atmosphere of elegant ambiance that again in turn enhances the customers' experience. Indeed, the use of ice sculptures has become commonplace in many settings ranging from wedding banquets to cruise ship dining. And like lighting fixtures, the use of ice sculptures has attracted a consumer market in related products.

SUMMARY OF THE INVENTION

The present invention combines a light source with a light diffuser where the latter is constructed of a diffuser material that, while initially solid or frozen, commences to melt at room temperature during utilization of the invention. The light source can be of many types, including but not limited to candles, incandescent or fluorescent lights, phosphorescent chemical combinations, light emitting diodes (LEDs), and so forth. The light diffuser can likewise be constructed from many types of diffuser materials, including but not limited to clear or colored frozen water, "dry ice," other frozen substances that, at normal room temperatures ranging from 60 to 85 degrees Fahrenheit, are generally found in liquid, liquid-like, or gaseous forms. This further includes diffuser materials that, when exposed to the heat of a specific light source being used, melt and assume a liquid form at an increased rate. Naturally, this invention is suitable for both indoor and outdoor utilization.

A preferred embodiment of the invention includes a geometrically-shaped translucent base to support the light source and the light diffuser wherein the base includes a collection element to collect the melted light diffuser material. In such an embodiment, this collection element can be placed in a freezer and used as a mold to shape the diffuser material into solid form for repetitive use in the light fixture. The base in this embodiment also includes a core member with a horizontal surface upon which the light diffuser and light source can be placed during use. Furthermore, to prevent lateral or rotational shifting of the light diffuser as it melts, the surface of the core member in this embodiment is shaped to correspond to the molded shape of the light diffuser in a manner consistent with the melt pattern, and may or may not include a plurality of low-profile vertical wedges to keep the light diffuser in place. The core member in this embodiment will also has a plurality of drain holes which allow the melted diffuser material to collect and pass into the base member as the diffuser melts during utilization, and will also have a plurality of ribs to prevent the light diffuser from interfering with the flow of melted diffuser material through the drain holes. Finally, to prevent unwanted dripping sounds, the core member in this embodiment also has on its bottom side a series of flow guides extending from the lower openings of the drain holes downward and toward an interior vertical wall of the collection element.

This particular preferred embodiment of the present invention has the advantage of allowing the melted diffuser material to be captured without leaking onto the surface that supports the lighting fixture. Moreover, the core member positioned atop of the collection elements has the added benefit of suspending the light source and the light diffuser above the collection element and thereby provides an enhanced appearance for displaying the ornamental features of the light diffuser.

DETAILED DESCRIPTION OF A PREFERRED EMBODIMENT

Figure 1:
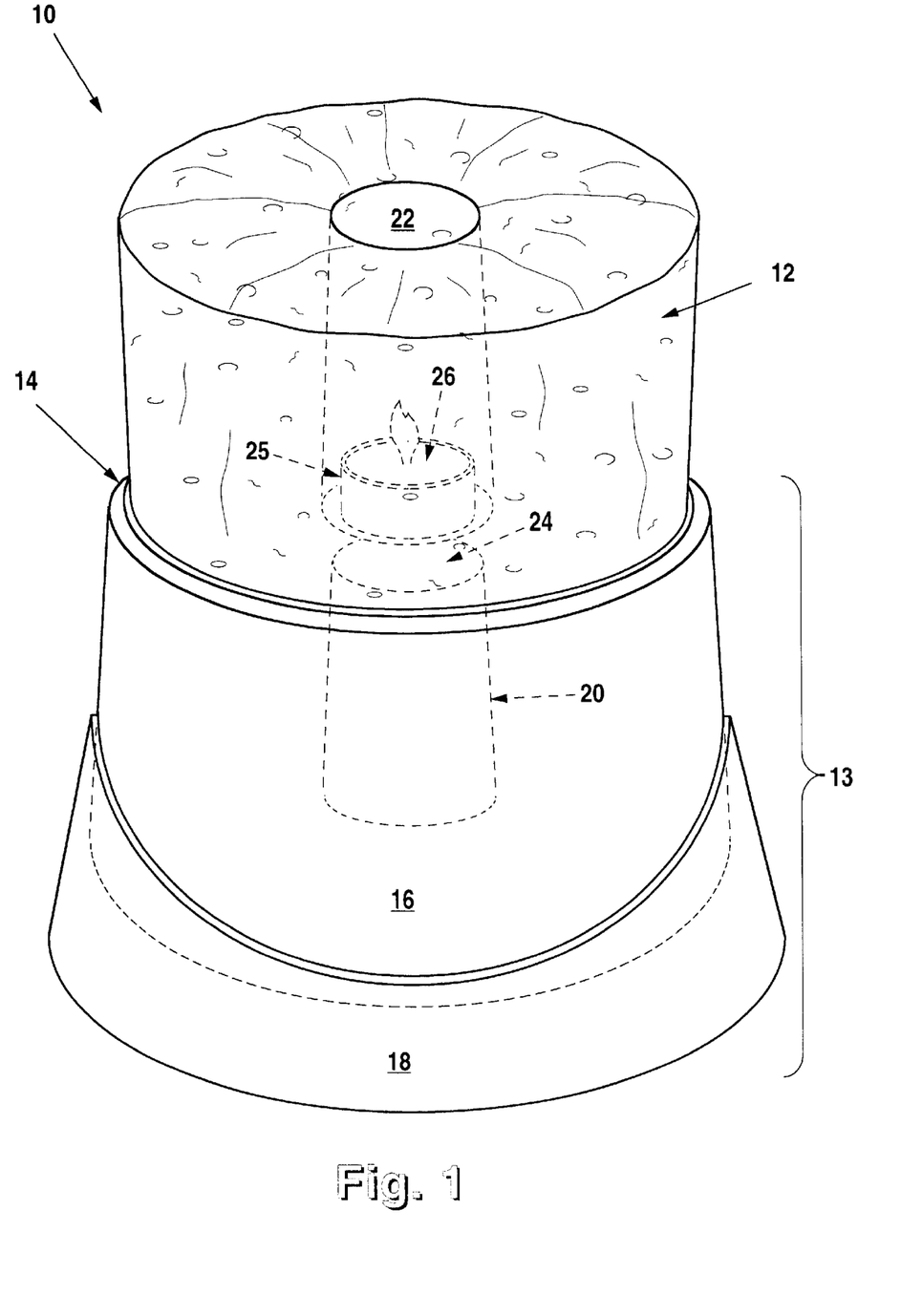
FIG. 1 is a perspective view of the ice-lighting fixture of the present invention supporting a light diffuser as described in the preferred embodiment.
Figure 2:
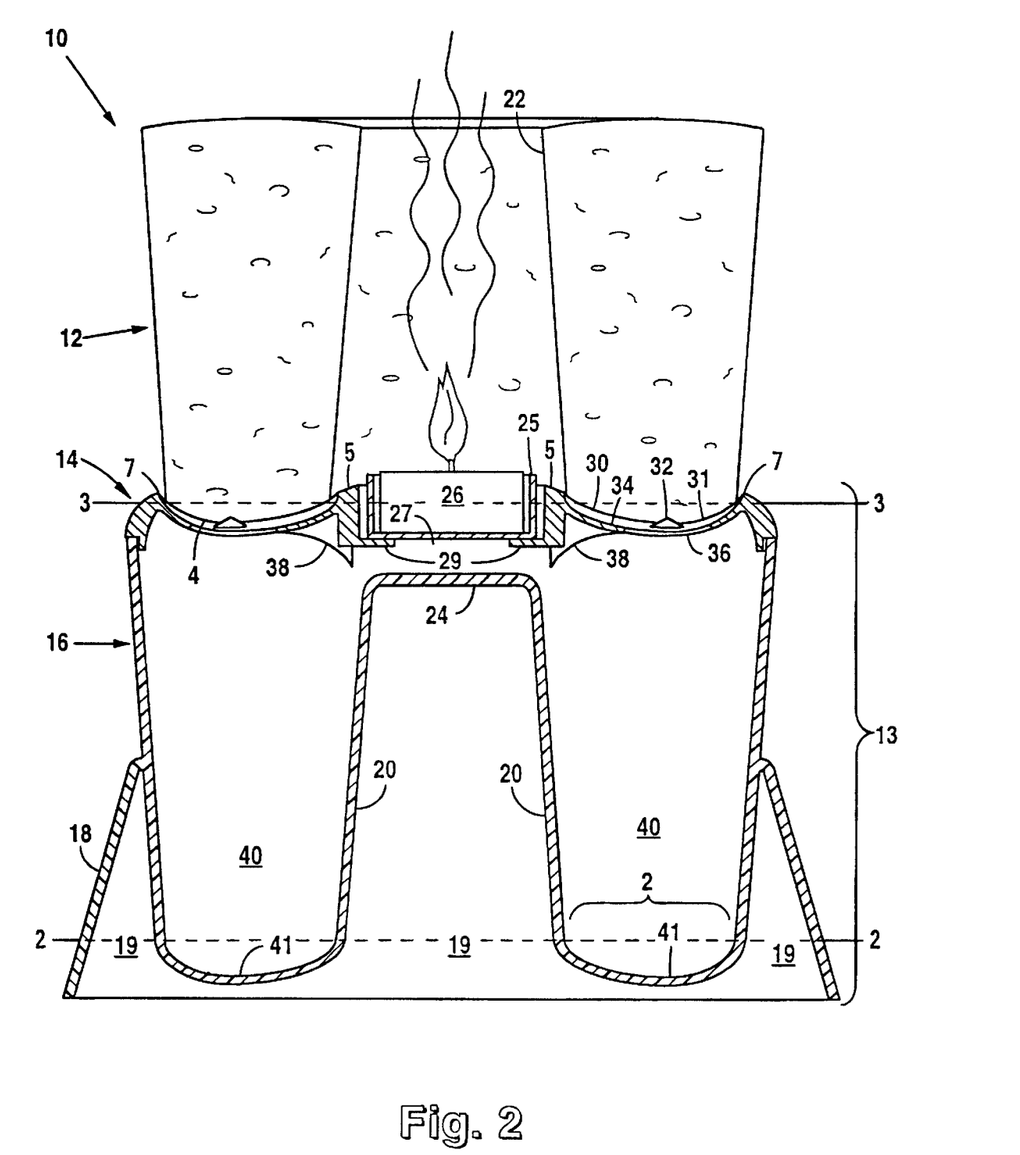
FIG. 2 is a cross-sectional view of the ice-lighting fixture of the present invention.
Figure 3:
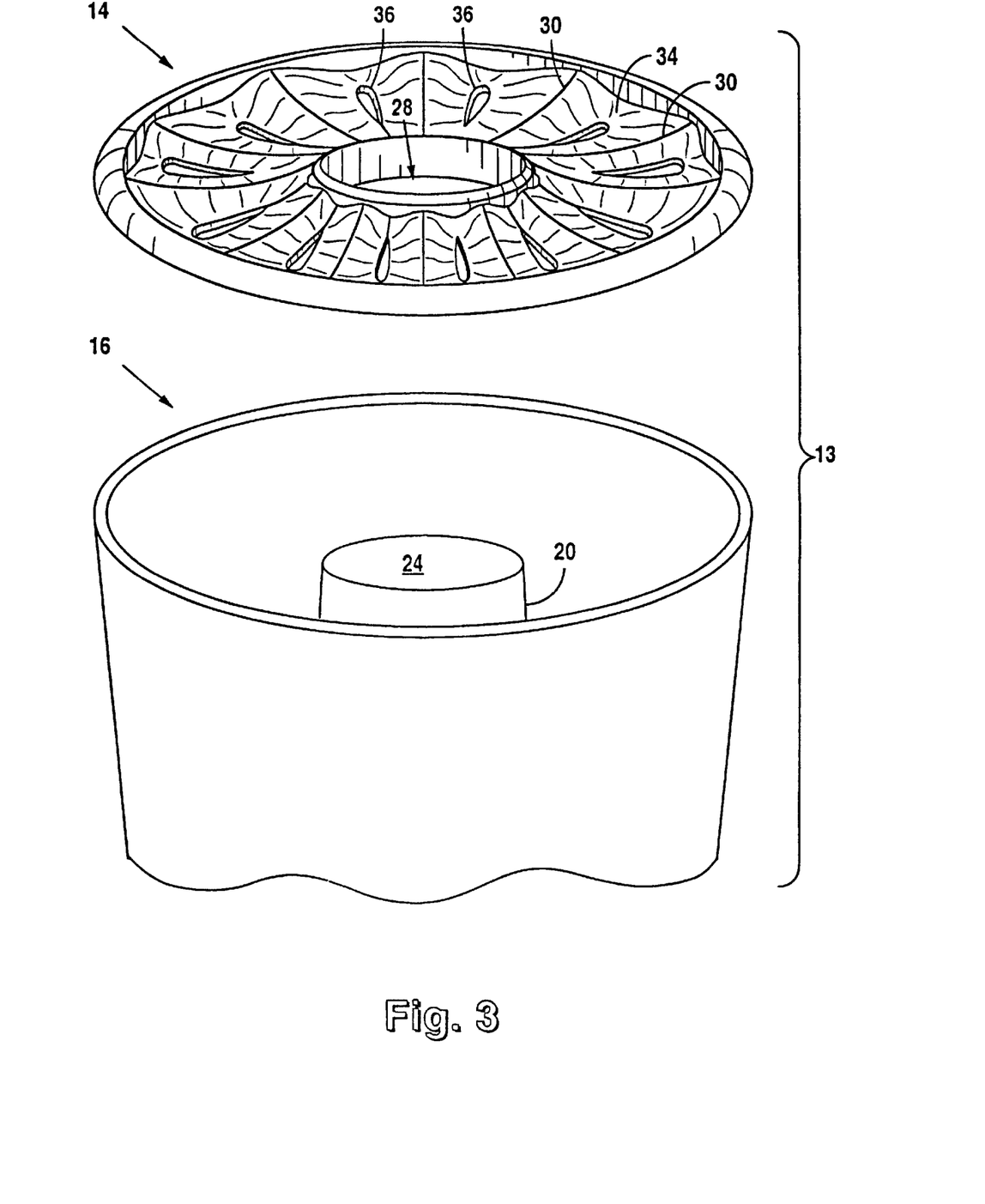
FIG. 3 is a perspective view of the core member that supports the ice light diffuser suspended above the collection element.

Generally referring to FIGS. 1–2, the basic invention is a lighting fixture 10 consisting of a light diffuser 12 substantially surrounding a light source 26 together supported by a base structure 13. The light diffuser 12 is constructed of a diffuser material initially in solid form but which loses its solid form by melting and/or sublimating at room temperatures. Diffuser material, as used herein, is any material that is typically not in solid form at room temperatures but which can be solidified at sufficiently lower temperatures and will return to a non-solid form over time by melting and/or sublimating when again exposed to room temperatures. Room temperatures, as used herein, are defined as temperatures greater than or equal to 60 degrees Fahrenheit with a preferred range from 60 degrees Fahrenheit to 85 degrees Fahrenheit. Sufficiently lower temperatures, as used herein, refer to corresponding temperatures at which specific diffuser materials solidify and which, in all cases, are less than 60 degrees Fahrenheit.

Referring to FIGS. 1–6, a preferred embodiment of the invention is a lighting fixture 10 consisting of a light diffuser 12 substantially surrounding a light source 26 together supported by a base structure 13, wherein the light diffuser 12 is constructed of a diffuser material initially in solid form but which loses its solid form by melting and/or sublimating at room temperatures. The base structure 13 is further comprised of a core member 14 circumferentially engaged atop a collection element 16 (both of which are preferably made from a translucent material).

In this embodiment, the collection element 16 is an elliptical and substantially cylindrical receptacle. (In other preferred embodiments, the collection element 16 can be formed in other geometric shapes based on rectangles, triangles, hexangles, etc., or in non-geometric shapes of unlimited varying designs.) Centrally located in the interior of the collection element 16 is a near-vertical column 20 that terminates in a horizontal surface 24 that lies below the horizontal plane created by the outer circumferential wall of the collection element 16. The interior base 41 of the collection element 16 has a gradual concave curve extending radially along line 2—2 from the centrally located near-vertical column 20 to the outer circumferential wall. The collection element 16 also has an exterior circumferential base member 18 to add stability in use, and which also serves as a warming-substance reservoir 19 when the collection element in inverted (discussed later herein).

The core member 14 is a correspondingly elliptical and substantially horizontal surface element that engages the collection element 16 around the circumferential perimeter. The core member 14 has a centrally located shallow hollow near-vertical column 28 possessing a scallop opening 27 and a circumferentially intermittent supporting perimeter 29, the surface of which forms a partial flat horizontal surface around the perimeter of the base of the shallow hollow near-vertical column 28. This partial flat horizontal surface is suitable for supporting a light source centering holder 25 in a manner that prevents the light source centering holder 25 from completely blocking air passing through the scallop opening 27 while simultaneously preventing the light source centering holder 25 from passing through the scallop opening 27.

The remaining surface of the core member 14 generally has a gradual concave curve extending radially along line 3—3 from circumference 7 of the core member 14 to the circumferential lip 5 of the centrally located shallow hollow near-vertical column 28 and is substantially identical to the gradual concave curve extending radially along line 2—2 of the interior base 41 of the collection element 16. The specific shape of both of these gradual concave curves correspond to the general de-solidification pattern of the light diffuser's vertical surfaces which, in this embodiment, is generally characterized by a rate of de-solidification along the hollow near-vertical column 22 that is approximately twice the rate of de-solidification of the exterior vertical surface of the light diffuser 12—which, in effect, means that the surface of hollow near-vertical column 22 expands toward the outer vertical surface of the light diffuser 12 at approximately twice the rate that the outer vertical surface of the light diffuser contracts toward the surface of the hollow near-vertical column 22. Consequently, and corresponding to this general de-solidification pattern, the lowest point of the gradual concave curve extending radially from circumference 7 of the core member 14 to the circumferential lip 5 of the centrally located shallow hollow near-vertical column 28 lies approximately ⅓ of the distance from the circumference 7 of the core member 14 to the centrally located shallow hollow near-vertical column 28 (or, from the reverse perspective, the lowest point would lie approximately ⅔ of the distance from the centrally located shallow hollow near-vertical column 28 to the circumference 7 of the core member 14). This ⅓ (⅔) radially-distanced intermediate circumference found in this embodiment is referred to as the de-solidification center-boundary 37.

Figure 6:
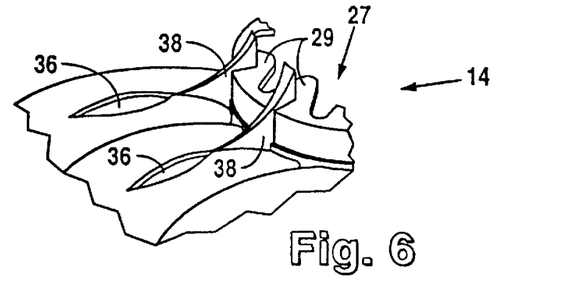
FIG. 6 is a partial perspective view of the core member in FIG. 3, FIG. 4, and FIG. 5 turned up side down and illustrating the flow guides extending from the drain holes toward the position where the interior vertical wall of the collection element meets the core member.

This surface of core member 14 (but not the interior base 41 of collection element 16) is also characterized by a ribbing pattern with ridges 30 and valleys 34 each extending radially along line 3—3 from circumference 7 of core member 14 to the circumferential lip 5 of the shallow hollow near-vertical column 28, thus producing a corresponding wave form pattern of oscillating convex ridges 30 and concave valleys 34 when traversed along an intermediate circumference such as the de-solidification center-boundary 37. The lowest elevation of each valley is also characterized by a radially elongated drain hole 36. Furthermore, running from intermittent points on each ridge 30 to the drain hole 36 of each corresponding valley 34 is a series of shallow flow guides 42 forming hairline non-intersecting stream beds in the ribbing. Finally, as best illustrated in FIG. 6 which depicts a partial perspective view of an inverted core member 14, a drip flow guide 38 extends diagonally downward from the lowest exit point of each drain hole 36 to a terminus vertically aligned with the uppermost portion of the nearly vertical sides of the near-vertical column 20 in the collection element 16.

In this embodiment, the light diffuser 12 is preliminarily constructed by solidifying water, a preferred diffuser material, in the collection element 16 via exposing the diffuser material to sufficiently lower temperatures—in this embodiment, by placing the diffuser material contained in the collection element 16 into a refrigeration freezer—for a sufficient period of time. Well known to those skilled in the art is the fact that the resultant light diffuser 12—herein made of frozen water, commonly referred to as ice—will form with a controlled exterior shape corresponding to the interior shape of the shape mold used during solidification of the diffuser material and with an uncontrolled upper surface that forms in accordance with the solidifying characteristics of the diffuser material. Consequently, using collection element 16 as the shape mold, the light diffuser 12 will have an elliptical and substantially cylindrical exterior shape with a centrally located hollow near-vertical column 22. Furthermore, the light diffuser 12 will also have a gradual convex-curved base 31 extending radially from the outer circumference to the centrally located hollow near-vertical column 22.

In preparation for use, the light diffuser 12 produced in the collection element 16 is removed from said collection element. The preferred method for removing said light diffuser 12 from the collection element 16 is to invert the collection element 16 and fill the warming-substance reservoir 19 with a warming-substance (preferably warm water) which in turn will cause the light diffuser 12 to seperate from the collection element 16—this general method of separating these kinds of solidified substances from their mold being well-known to those skilled in the art. Once the light diffuser 12 is removed from the collection element 16, it is then placed atop the core member 14 which, in turn, is placed atop the collection element 16. Prior to setting the light diffuser 12 atop of the core member 14, a preferred light source—in this embodiment, a votive candle 26 placed in a light source centering holder 25—are together placed atop of the intermittent supporting perimeter 29 in the shallow hollow near-vertical column 28 of the core member 14. The light source centering holder 25 is specifically designed to continuously engage the most central portions of the intermittent supporting perimeter 29 at all times—thus preventing the votive candle 26 placed in a light source centering holder 25 from falling through the scallop opening 27—while simultaneously providing that at least portions of the scallop opening 27 are unobstructed by the light source centering holder 25 in a manner suitable for the passage and movement of air, and thus provide additional oxygen to the burning votive candle in this embodiment. (In an alternative embodiment, a typical "tea-light" candle—a self-contained candle and candle holder of standard size—could also be used in lieu of the votive candle 26 and the light source centering holder 25. In such an embodiment, the intermittent supporting perimeter 29 would support the tea-light candle in essentially the same manner as it supports the votive candle 26 placed in a light source centering holder 25 and prevents said combination from falling through the scallop opening 27.)

Since the highest elevation surface formed by the ridges 30 of the core element member 14 have a radially-oriented concave shape corresponding to the interior base 41 of the collection element 16 that was used as a shape mold to form the light diffuser 12, the gradual convex-curved base 31 of the light diffuser 12 will initially seat and center itself onto the concave surface formed by the ridges 30 of core member 14. The gradual convex-curved base 31 of the light diffuser 12 and the gradual concave shape along the ridges 30 of the core member 14 prevent the light diffuser 12 from laterally shifting atop the core member 14, while the elliptical shape of both the light diffuser 12 and the core member 14 further prevent rotational movement of the light diffuser 12 while sitting atop the core member 14.

In addition, the circumferentially convex ridges 30 that together form the radially concave highest elevation surface of the core member 14 also provide a maximal surface area to contact with the gradual convex-curved base 31 of the light diffuser 12. Because the gradual convex-curved base 31 de-solidifies (i.e., melts) most rapidly along points of greatest external pressure—a fact well known to those skilled in the art—the maximum surface area provided by the circumferentially convex ridges 30 prevents rapid de-solidification of the gradual convex-curved base 31 that might otherwise result in the light diffuser 12 settling into the concave valleys 34 and block the drain holes 36. Furthermore, keeping the concave valleys 34 free from the gradual convex-curved base 31 of the light diffuser 12 also allows additional air to flow from outside the light fixture 10 beneath the light diffuser 12 to the light source 26 which serves to both cool the light source 26 (and thereby slow internal melting of the light diffuser 12 along the hollow near-vertical column 22) as well as provide additional oxygen to the burning candle in this embodiment.

Once in use, the light diffuser 12 (i.e., the ice) gradually de-solidifies (i.e., melts) and reverts back to diffuser material (i.e., water). This diffuser material flows down the vertical surfaces of the light diffuser 12 and onto the ribbed surface of the core member 14. The diffuser material is then naturally drawn into the shallow flow guides 42 and directed away from the ridges 30, flowing down into the valleys 34, through the drain holes 36, along the drip flow guides 38 to the lowest-end terminus of these flow guides 38, separating and vertically dripping from this terminus to engage the uppermost portion of the nearly vertical sides of the near-vertical column 20, travelling along the nearly vertical sides of near-vertical column 20 and quietly settling in a pool of diffuser material being retained in the bottom interior portions 40 of the collection element 16. This design provides for the continuous drawing off of de-solidified diffuser material while additionally preventing the unwanted sounds of free-fall liquid dripping from the core member 14 directly into the diffuser material collecting in the bottom interior portions 40 of the collection element 16. As used herein, free-fall liquid dripping refers to droplets of diffuser material that become completely detached from surfaces of the light fixture 10 and travel through air and space until impacting with another surface such that impacting with a nearly vertical surface creates little or no sound while impacting with a substantially horizontal surface (including the surface created by any collected material) creates an unwanted noise.

Once the light diffuser 12 has been de-solidified, the collection element 16 can be repeatedly used to recreate the light diffuser 12 for repeated utilization in the light fixture 10.

Figure 4:
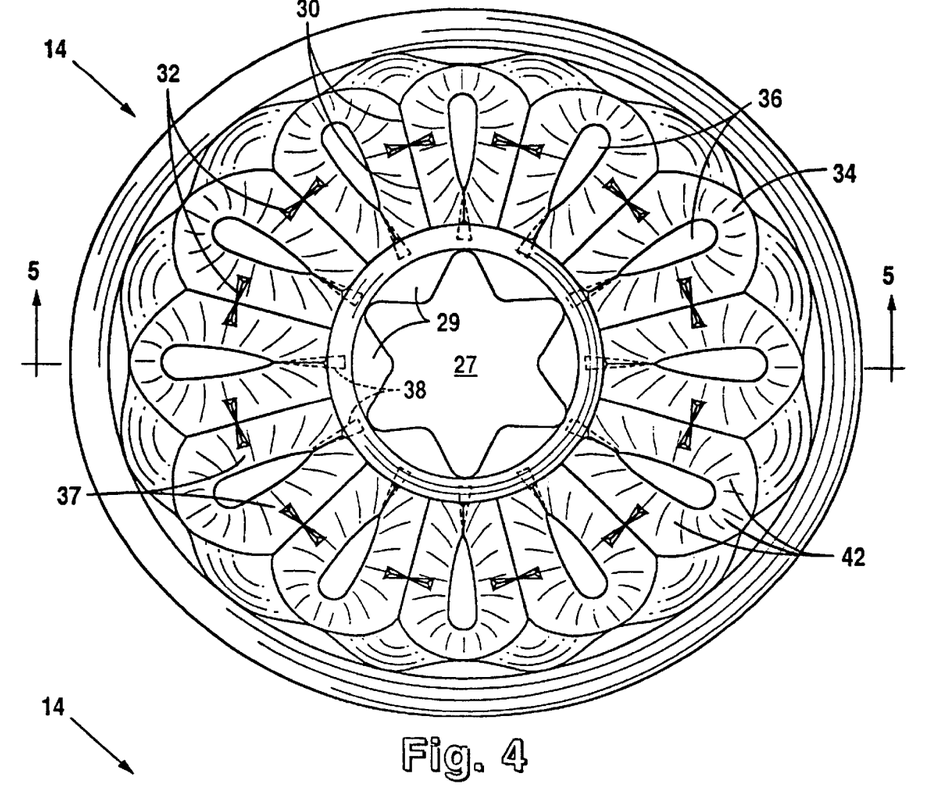
FIG. 4 is a plan view of a the core member shown in FIG. 3 illustrating the support ribs and the drain holes that allow melted ice to flow into the receptacle.
Figure 5:
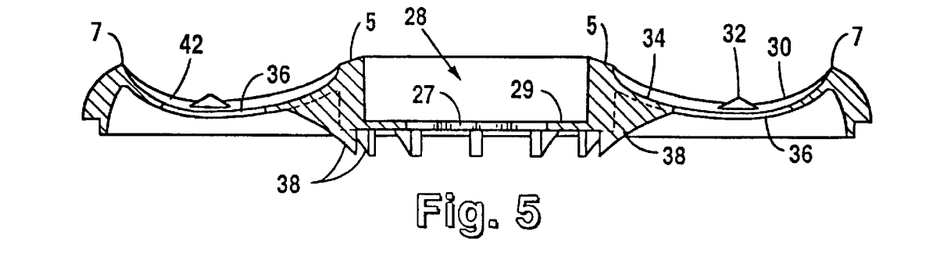
FIG. 5 is a cross-sectional view along line 5—5 of the core member shown in FIG. 3 and FIG. 4 that illustrates the vertical anchor studs that prevent lateral and/or rotational shifting of the light diffuser.

An additional preferred embodiment of the invention illustrated in FIGS. 2, 4, and 5 utilizes low-profile vertical wedges 32 emplaced along the de-solidification center-boundary 37 straddling each convex ridge 30 in order to further stabilize the light diffuser 12 atop of the core member 14. The low-profile vertical wedges 32, the apex of each having a low surface area and thus exerting high pressure at corresponding points along the gradual convex-curved base 31 of the light diffuser 12, cause rapid melting along the points of contact and cause the light diffuser 12 to settle around the low-profile vertical wedges 32 which, once embedded in the gradual convex-curved base 31, act to further prevent lateral shifting and rotation of the light diffuser in conjunction with, or in place of, the gradual concave curve extending radially along line 3—3.

Figure 7:
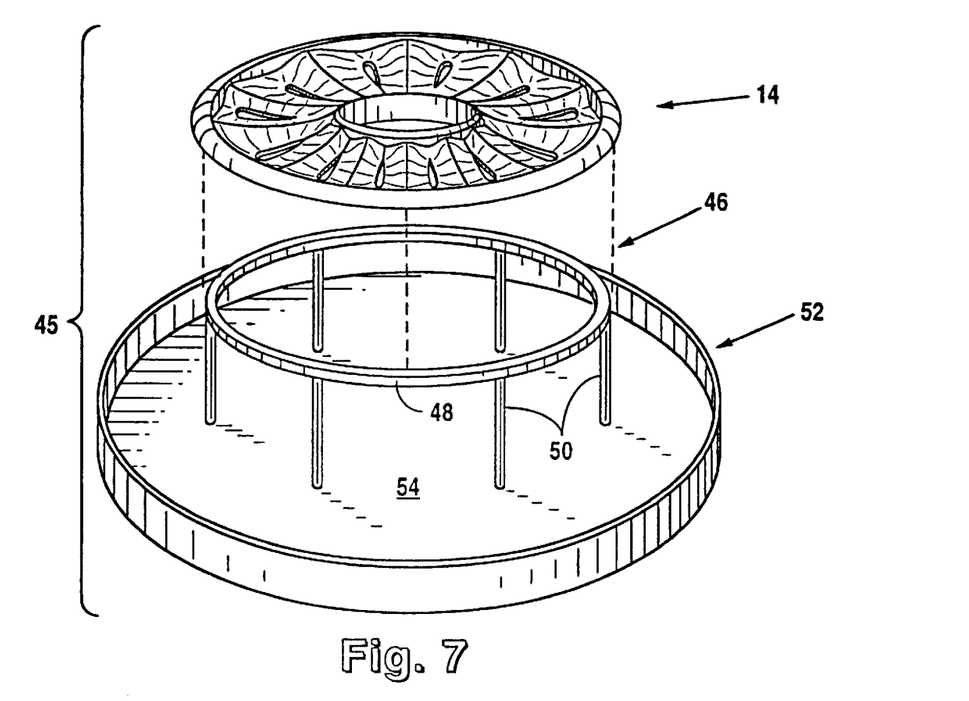
FIG. 7 is a perspective view of an alternative embodiment of the ice-lighting fixture on display, absent the light diffuser and light source, where the core member is suspended by an alternate base design and also has a collection element that lacks the features of the collection element in the preferred embodiment.

Another preferred embodiment of the invention bifurcates the shape mold element from the collection element in contrast to the previously described embodiment and is illustrated in FIG. 7. In this alternate preferred embodiment, the alternate base structure 45 for the light fixture is comprised of a core member 14 supported and suspended by a support structure which in this particular embodiment is a circumferential stand 46 comprising a horizontal circumferential ring 48 supported by a series of vertical suspension legs 50, where the circumferential stand 46 is emplaced on the flat interior surface 54 of a low-profile collection element 52 (which could not be used as a shape mold in forming the light diffuser 12). (The light diffuser 12 and the shape mold used to produce the light diffuser—which in this embodiment is still the collection element 16—are not shown in this illustration but can be found in FIGS. 1–3.) In a variation of this embodiment, the low-profile collection element 52 can be used as a vegetable or hors d'oeuvre tray or as a decorative holder for potpourri, other candles, decorative ornaments, and the like.

Figure 8:
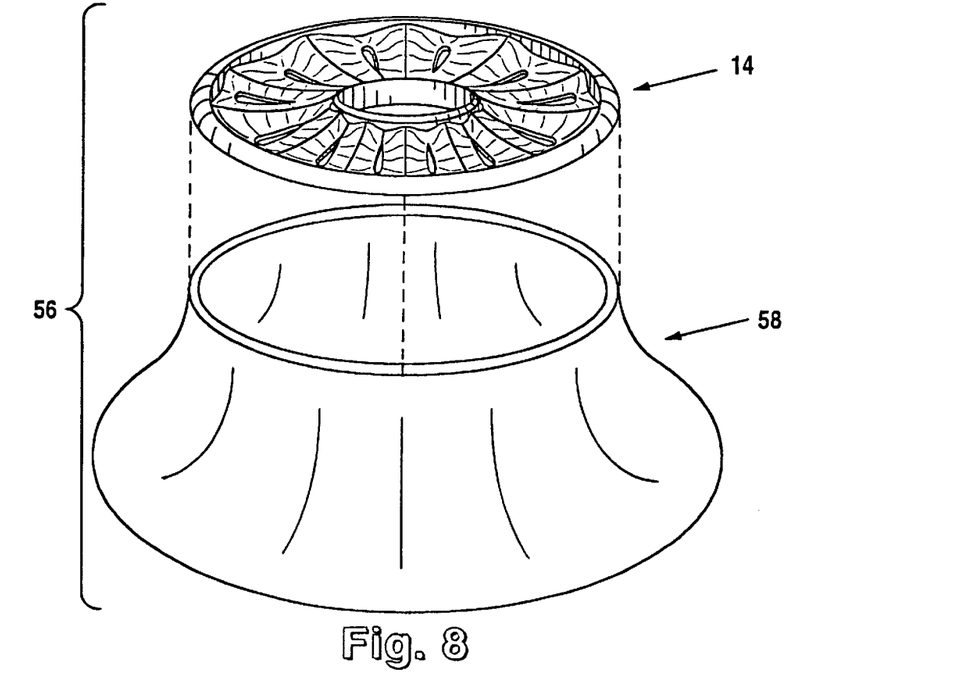
FIG. 8 is a perspective view of a second alternative embodiment of the ice-light fixture on display, absent the light diffuser and light source, where the core member is suspended above an alternate base design with a collection element but where the collection element does not serve as a mold for shaping the light diffuser as shown in the preferred embodiment.

Yet another preferred embodiment that likewise bifurcates the shape mold element from the collection element is illustrated in FIG. 8. In this alternative preferred embodiment, the stump base structure 56 is comprised of a core member 14 supported by a wide-base collection element 58 (which could not be used to produce the light diffuser 12). (The light diffuser 12 and the shape mold used to produce the light diffuser—which in this embodiment is still the collection element 16—are not shown in this illustration but can be found in FIGS. 1–3.) In a variation of this embodiment, the wide-base collection element can include decoration consistent with a holiday or seasonal theme, or more in fact be modified in shape and form to conform to a desired structure such as a Christmas tree, a Valentine's heart, or the geographic shape of a state such as Texas, for example.

As previously indicated, alternative preferred embodiments can use alternative base structures specifically designed to serve a secondary purpose; for example, the base structure could comprise a floral display or a food tray. Furthermore, alternative base designs may incorporate specific seasonal or holiday themes, or other commemorative events such as birthdays, anniversaries, weddings, and so forth in any maimer intended to compliment the functional or aesthetic qualities of the light diffuser invention.

Additional alternative preferred embodiments can also vary the diffuser material used to produce the light diffuser to include, but not limited to, variations of common elements (such as adding coloration to water) or changing the base substance (such as by using solidified nitrogen, also known as "dried-ice," that sublimates at room temperature), or these additional alternative preferred embodiments may vary the specific light source to include, but not limited to, using fluorescent or incandescent lighting of white or colored light, sources of ultraviolet light, phosphorescent chemicals, light emitting diodes (leds), or other light-emitting sources and/or combination of sources proximally located with regard to the light diffuser.

I claim:

1. A lighting fixture comprising:
   a light source;
   a light diffuser substantially surrounding said light source, wherein said light diffuser has at least one surface that at least partially bounds a void surrounding said light source, and wherein said light diffuser is constructed of a diffuser material initially in solid form but which de-solidifies at room temperatures; and
   a base structure to support at least said light diffuser.

2. The lighting fixture of claim 1, wherein said base structure further comprises a core member having a substantially horizontal surface element to support said light diffuser and said light source.

3. The lighting fixture of claim 2, wherein said light diffuser comprises a material that de-solidifies into a liquid form at some room temperatures, said lighting fixture further comprising a collection element below said light diffuser to collect and contain liquid de-solidified light diffuser material.

4. The lighting fixture of claim 3, wherein said collection element has at least one wall defining an interior volume that serves as a shape mold for forming said light diffuser.

5. The lighting fixture of claim 4, said collection element further comprising an exterior circumferential base member to add stability in use.

6. The lighting fixture of claim 5, wherein said exterior circumferential base member serves as a warming-substance reservoir when the collection element is inverted.

7. The lighting fixture of claim 4, said collection element further comprising a centrally-located near-vertical column to produce a corresponding hollow near-vertical column in said light diffuser when said collection element serves as said shape mold used to produce said light diffuser.

8. The lighting fixture of claim 7, wherein said at least one wall comprises an outer wall having an uppermost portion, and wherein an uppermost portion of said near-vertical column terminates in a horizontal surface, wherein said horizontal surface is below a parallel horizontal plane defined by the uppermost portion of the outer wall.

9. The lighting fixture of claim 8, said collection element further comprising an interior base having a gradual concave curve extending radially from said near-vertical column toward said outer wall.

10. The lighting fixture of claim 9, wherein a lowest point of said radially-extending gradual concave curve of said interior base is radially positioned based upon radially varying rates at which portions of said light diffuser de-solidify.

11. The lighting fixture of claim 10, wherein the lowest point in said radially-extending gradual concave curve of said interior base is circumferentially located approximately two-thirds of a radial distance from said near-vertical column to an outermost point of said radially-extending gradual concave curve.

12. A lighting fixture as set forth in claim 1, wherein said light source is a candle.

13. A lighting fixture as set forth in claim 12, wherein said candle is contained in a light source centering holder.

14. A lighting fixture comprising:
    a light source;
    a light diffuser substantially surrounding said light source, said light diffuser constructed of a diffuser material initially in solid form but which de-solidifies at room temperatures; and
    a base structure to support at least said light diffuser, said base structure including a core member having a substantially horizontal surface element to support said light diffuser, wherein said substantially horizontal surface element has at least one drain hole through which a melted portion of said light diffuser can pass.

15. The lighting fixture of claim 14, the core member comprising a centrally located shallow hollow vertical column to support and contain said light source.

16. The lighting fixture of claim 15, said shallow hollow vertical column having formed therein one or more openings through which air can flow.

17. The lighting fixture of claim 16, wherein said opening is a scallop opening comprising a circumferentially intermittent supporting perimeter along a base of said shallow hollow vertical column suitable for supporting a light source centering holder, said light source centering holder being of such size and shape that said light source centering holder cannot pass through said scallop opening.

18. The lighting fixture of claim 17, wherein said light source centering holder is shaped such that said light source centering holder is incapable of totally blocking said scallop opening and preventing air from passing through portions of said scallop opening.

19. The lighting fixture of claim 14, wherein said substantially horizontal surface of said core member comprises at least one low-profile vertical wedge.

20. A lighting fixture as set forth in claim 14, wherein said light source is a candle.

21. A lighting fixture as set forth in claim 20, wherein said candle is contained in a light source centering holder.

22. A lighting fixture comprising:

a light source;

a light diffuser substantially surrounding said light source, said light diffuser constructed of a diffuser material initially in solid form but which de-solidifies at room temperatures; and a base structure to support said light source and said light diffuser, said base structure comprising a core member having an inner circumference, an outer perimeter circumference, and a substantially horizontal surface having a gradual concave curve extending radially from the inner circumference surrounding said light source toward the outer perimeter circumference of said core member.

23. The lighting fixture of claim 22, wherein a lowest point of said radially-extending gradual concave curve is radially positioned based upon radially varying rates at which portions of said light diffuser de-solidify.

24. The lighting fixture of claim 23, wherein the lowest point in said radially-extending gradual concave curve is circumferentially located approximately two-thirds of a radial distance from said inner circumference surrounding said light source to an outermost point of said radially-extending gradual concave curve.

25. The lighting fixture of claim 22, wherein said substantially horizontal surface further comprises a ribbing pattern with a plurality of alternating ridges and valleys that each extend radially outward from said inner circumference.

26. The lighting fixture of claim 25, wherein each said valley further comprising a drain hole through which a melted portion of said light diffuser can pass.

27. The lighting fixture of claim 26, wherein each said ridge further comprises a plurality of shallow flow guides running from a crest of said ridge to said drain hole.

28. The lighting fixture of claim 26, wherein each said drain hole further comprises a drip flow guide extending diagonally downward from said drain hole.

29. The lighting fixture of claim 22, wherein said substantially horizontal surface of said core member comprises at least one low-profile vertical wedge along an intermediate circumference between said inner circumference surrounding said light source to said outer perimeter circumference of said core member.

30. A lighting fixture as set forth in claim 22, wherein said light source is a candle.

31. A lighting fixture as set forth in claim 30, wherein said candle is contained in a light source centering holder.

32. A lighting fixture, comprising:

a base structure to support a light source and a light diffuser that comprises a material that de-solidifies into a liquid form at some room temperatures, said base structure including:

a core member having:

a shallow hollow vertical column for containing the light source; and a substantially horizontal surface surrounding the shallow hollow vertical column and terminating in an outer perimeter circumference, wherein the substantially horizontal surface has a gradual concave curve extending radially from the shallow hollow vertical column toward the outer perimeter circumference; and a collection element below said core member to collect and contain liquid de-solidified light diffuser material.

33. The lighting fixture of claim 32, wherein the collection element has at least one wall defining an interior volume that serves as a shape mold for forming the light diffuser.

34. The lighting fixture of claim 33, said collection element further comprising a centrally-located near-vertical column to produce a corresponding hollow near-vertical column in the light diffuser when said collection element serves as said shape mold used to produce the light diffuser.

35. The lighting fixture of claim 34, said collection element further comprising an interior base having a gradual concave curve extending outward radially from said near-vertical column.

36. A lighting fixture, comprising:

a core member having a central support for a light source and a substantially horizontal annular surface for supporting a light diffuser substantially surrounding the light source, wherein said substantially horizontal annular surface has at least one hole through which a melted portion of said light diffuser can pass; and a collection element, below the core member, to collect and contain light diffuser material that has melted.

37. The lighting fixture of claim 36, wherein the central support comprises a centrally located shallow hollow vertical column to support and contain the light source.

38. A lighting fixture, comprising:

a core member having a central support for a light source and a substantially horizontal annular surface for supporting a light diffuser substantially surrounding the light source; and a collection element, below the core member, to collect and contain light diffuser material, wherein the collection element has at least one wall defining an interior volume that serves as a shape mold for forming the light diffuser and a centrally-located near-vertical column to produce a corresponding hollow near-vertical column in the light diffuser when said collection element serves as the shape mold used to produce the light diffuser.

39. The lighting fixture of claim 38, said collection element further comprising an interior base having a gradual concave curve extending outward radially from said centrally located near-vertical column.

40. A lighting apparatus, comprising:

a light source; and a light diffuser substantially surrounding said light source, wherein said light diffuser has at least one surface that at least partially bounds a void surrounding said light source, and wherein said light diffuser is constructed of a diffuser material initially in solid form but which de-solidifies at room temperatures.

41. The lighting apparatus of claim 40, wherein the at least one surface has at least a top edge and said at least one surface defines a substantially vertical hollow column that is open at the top edge.

42. The lighting apparatus of claim 41, wherein the light source comprises a candle.

43. The lighting apparatus of claim 42, wherein the diffuser material comprises water.

* * * * *

UNITED STATES PATENT AND TRADEMARK OFFICE
CERTIFICATE OF CORRECTION

PATENT NO. : 6,315,433 B1
DATED : November 13, 2001
INVENTOR(S) : Cavello

It is certified that error appears in the above-identified patent and that said Letters Patent is hereby corrected as shown below:

<u>Column 5,</u>
Line 37, delete the word "element".

<u>Column 7,</u>
Line 26, delete the word "maimer" and replace it with the word -- manner --.
Line 39, delete the word "(leds)" and replace it with the word -- (LEDs) --.

Signed and Sealed this

Twenty-first Day of May, 2002

*Attest:*

JAMES E. ROGAN
*Attesting Officer*     *Director of the United States Patent and Trademark Office*